US011086743B2

(12) United States Patent
Santhar et al.

(10) Patent No.: US 11,086,743 B2
(45) Date of Patent: Aug. 10, 2021

(54) CONTEXT BASED IOT DEVICE MANAGEMENT

(71) Applicant: International Business Machines Corporation, Armonk, NY (US)

(72) Inventors: Sathya Santhar, Chennai (IN); Balamurugaramanathan Sivaramalingam, Paramakudi (IN); Samuel Mathew Jawaharlal, Chennai (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/658,266

(22) Filed: Oct. 21, 2019

(65) Prior Publication Data

US 2021/0117300 A1   Apr. 22, 2021

(51) Int. Cl.
*G06F 15/02* (2006.01)
*G06F 11/30* (2006.01)
*G10L 15/02* (2006.01)
*G06K 9/32* (2006.01)
*G06F 9/4401* (2018.01)

(52) U.S. Cl.
CPC ........ *G06F 11/3013* (2013.01); *G06F 9/4418* (2013.01); *G06F 11/3082* (2013.01); *G06K 9/3241* (2013.01); *G10L 15/02* (2013.01)

(58) Field of Classification Search
CPC .............. G06F 11/3013; G06F 9/4418; G06F 11/3082; G06K 9/3241; G10L 15/02
See application file for complete search history.

(56) References Cited

U.S. PATENT DOCUMENTS

| 10,334,701 | B1* | 6/2019 | Siminoff ................ H05B 47/16 |
| 2016/0029458 | A1 | 1/2016 | Liu et al. |
| 2016/0073482 | A1 | 3/2016 | Fok et al. |
| 2016/0248847 | A1 | 8/2016 | Saxena et al. |
| 2016/0275706 | A1* | 9/2016 | Nolan .................... G06T 11/001 |
| 2017/0187783 | A1* | 6/2017 | Pogorelik .............. H04L 67/12 |
| 2017/0365152 | A1* | 12/2017 | Parra ..................... G08B 21/14 |
| 2018/0096690 | A1* | 4/2018 | Mixter .................... G06F 3/167 |

(Continued)

OTHER PUBLICATIONS

Poornima S et al., "Power Optimisation of the Devices using IoT with Android Appicalion", International Journal of Engineering Research & Technology (IJERT), vol. 5 Issue 05, May 2016, 4 pages <https://www.ijert.org/phocadownload/V515/IJERTV5IS050187.pdf>.

(Continued)

*Primary Examiner* — Tim T Vo
*Assistant Examiner* — Harry Z Wang
(74) *Attorney, Agent, or Firm* — James L. Olsen

(57) ABSTRACT

Aspects of the present disclosure relate to internet of things (IoT) device management. A first set of sensor data can be received from a first IoT device within an IoT sensor network, the IoT sensor network containing a plurality of IoT devices, wherein a subset of the plurality of IoT devices within the IoT sensor network are in an inactive state. The first set of sensor data can be analyzed to determine whether an activation condition is satisfied. In response to determining that the activation condition is satisfied, a second IoT device within the subset can be activated, wherein activation leads to collection of a second set of sensor data from the second IoT device.

19 Claims, 7 Drawing Sheets

(56) References Cited

U.S. PATENT DOCUMENTS

2018/0288159 A1* 10/2018 Moustafa ................ H04W 4/70
2019/0353502 A1* 11/2019 Doshi ..................... H04L 67/12

OTHER PUBLICATIONS

Rao et al., "A Self-Adapting Dynamic Service Management Platform for Internet of Things", LISS 2013: Proceedings of 3rd International Conference on Logistics, Informatics and Service Science, Dec. 2015, Abstract Only, 4 pages.

Hylli et al., "Orchestrating the Internet of Things Dynamically", Proceedings of the 1st International Workshop on Mashups of Things and APIs, Article No. 4, Dec. 12-16, 2016, 6 pages.

Unknown, "GDPR Exemptions: Who is Exempt from GDPR Requirements?", HIPAA Journal, printed Jul. 25, 2019, 3 pages, <https://www.hipaajournal.com/gdpr-exemptions-who-is-exempt-from-gdpr/.

Anonymous, "Smart Floor for in Room Detection", An IP.com Prior Art Database Technical Disclosure, IP.com No. IPCOM000255231D, IP.com Electronic Publication Date: Sep. 11, 2018, 23 pages.

Mell et al., "The NIST Definition of Cloud Computing", Recommendations of the National Institute of Standards and Technology, Sep. 2011, 7 pages.

* cited by examiner

CONTEXT BASED IOT DEVICE MANAGEMENT

BACKGROUND

The present disclosure relates generally to the field of internet of things (IoT) devices, and in particular, to context based management of IoT devices.

SUMMARY

Embodiments of the present disclosure relate to a method, system, and computer program product for internet of things (IoT) device management. A first set of sensor data can be received from a first IoT device within an IoT sensor network, the IoT sensor network containing a plurality of IoT devices, wherein a subset of the plurality of IoT devices within the IoT sensor network are in an inactive state. The first set of sensor data can be analyzed to determine whether an activation condition is satisfied. In response to determining that the activation condition is satisfied, a second IoT device within the subset can be activated, wherein activation leads to collection of a second set of sensor data from the second IoT device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
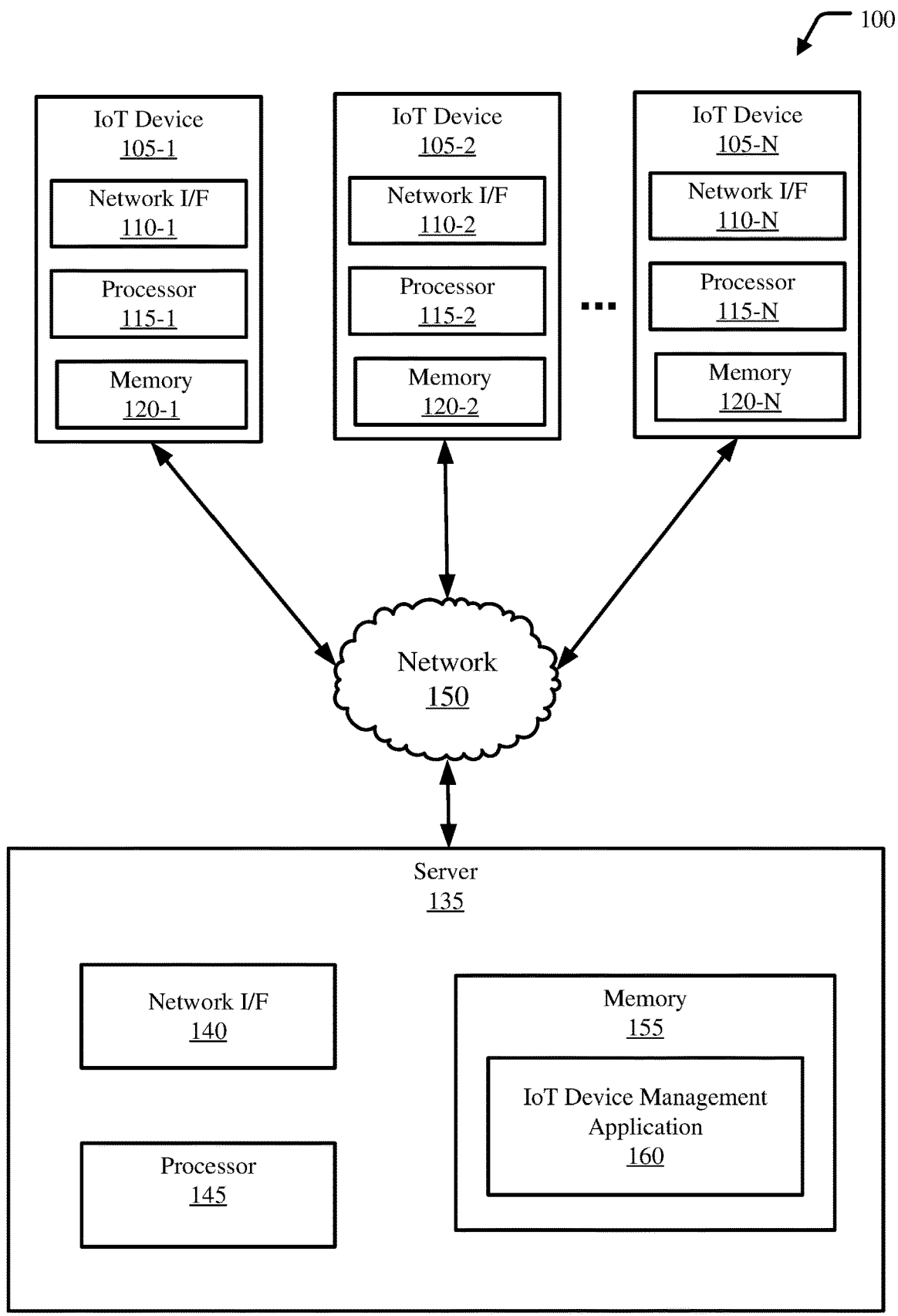
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of internet of things (IoT) devices and, in particular, to context based management of IoT devices. While the present disclosure is not necessarily limited to such applications, various aspects of the disclosure can be appreciated through a discussion of various examples using this context.

In internet of things (IoT) sensor networks, various IoT devices can be disposed throughout a given environment. These IoT devices can collect sensor data such as pressure, movement, airflow, heat, humidity, moisture, electromagnetic signals, images, force, etc. This sensor data can be used to intelligently issue commands. For example, heat sensor data can be used to control heating, ventilation, and cooling (HVAC) components, humidity sensor data can be used to control the state of a dehumidifier, electromagnetic signal data can be used to control traffic signals, etc. Because IoT devices require a power source, the cost associated with keeping an IoT sensor network online can become burdensome. For example, it may not be necessary for all IoT devices within a given IoT sensor network to be collecting data at all times, as particular sensors may only require activation during particular contexts.

Aspects of the present disclosure manage the state (e.g., active and inactive) of IoT devices based on contextual data (e.g., sensor data) collected by other IoT devices within an IoT sensor network. A first set of sensor data can be received from a first IoT device within an IoT sensor network, the IoT sensor network containing a plurality of IoT devices, where a subset of the plurality of IoT devices within the IoT sensor network are in an inactive state. The first set of sensor data can be analyzed to determine whether an activation condition is satisfied. In response to determining that the activation condition is satisfied, a second IoT device within the subset can be activated, where activation leads to collection of a second set of sensor data from the second IoT device.

Aspects of the present disclosure remove the need for all IoT devices within a given IoT sensor network to be activated at all times. By selectively activating inactive IoT devices based on contextual data, power and computing resources are conserved. For example, only sensor data from active devices is required to be analyzed, conserving computing power that may have otherwise been expended on data collected from IoT devices which do not require activation. Further, because power is only provided to IoT devices which require activation, the power that would have otherwise been expended on IoT devices which do not require activation is conserved.

Turning now to the figures, FIG. 1 is a block diagram illustrating an example computing environment 100 in which illustrative embodiments of the present disclosure can be implemented. Computing environment 100 includes a plurality of IoT devices 105-1, 105-2 . . . 105-N (collectively IoT devices 105), at least one server 135, and a network 150.

Consistent with various embodiments, the server 135 and the IoT devices 105 are computer systems. The IoT devices 105 and the server 135 include one or more processors 115-1, 115-2 . . . 115-N (collectively processors 115) and 145 and one or more memories 120-1, 120-2 . . . 120-N (collectively memories 120) and 155, respectively. The IoT devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The IoT devices 105 and/or the server 135 can be equipped with a display or monitor. Additionally, the IoT devices 105 and/or the server 135 can include optional input devices (e.g., a keyboard, mouse, scanner, a biometric scanner, video camera, or other input device), and/or any commercially available or custom software (e.g., browser software, communications software, server software, natural language processing software, search engine and/or web crawling software, image processing software, etc.). The IoT devices 105 and/or the server 135 can be servers, desktops, laptops, or hand-held devices.

The IoT devices 105 and the server 135 can be distant from each other and communicate over a network 150. In some embodiments, the server 135 can be a central hub from which IoT devices 105 can establish a communication connection, such as in a client-server networking model. Alternatively, the server 135 and IoT devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the IoT devices 105 and the server 135 can be local to each other and communicate via any appropriate local communication medium. For example, the IoT devices 105 and the server 135 can communicate using a local area network (LAN), one or more hardwire connections, a wireless link or router, or an intranet. In some embodiments, the IoT devices 105 and the server 135 can be communicatively coupled using a combination of one or more networks and/or one or more local connections. For example, the first IoT device 105-1 can be hardwired to the server 135 (e.g., connected with an Ethernet cable) while the second IoT device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 5.

The server 135 includes an IoT device management application 160. The IoT device management application 160 can be configured to manage the state of IoT devices 105 within an IoT sensor network. The IoT sensor network can be configured such that a first set of IoT devices (e.g., IoT device 105-1) are in an active state and a second set of IoT devices (e.g., IoT device 105-2-IoT device 105-N) are in an inactive state. Sensor data collected from the first set of IoT devices can be analyzed by the IoT device management application 160 such that IoT devices within the second set of IoT devices can be selectively activated. In some embodiments, the activation of IoT devices within the second set of IoT devices can be completed based a threshold. The threshold can, in embodiments, be based on the context of the collected sensor data. For example, the threshold can be based on a rate of change of sensor data, a value of sensor data, values obtained from two or more IoT devices within the IoT sensor network, an average value of sensor readings, etc.

In some embodiments, the activation of IoT devices within the second set of IoT devices can be completed based on a smart contract (e.g., a computerized transaction protocol that executes the terms of a contract, which may be a component of a distributed blockchain ledger). For example, various threshold conditions can be embodied as terms within a smart contract and used by the IoT device management application 160 to manage power provided to IoT devices within the IoT device network.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
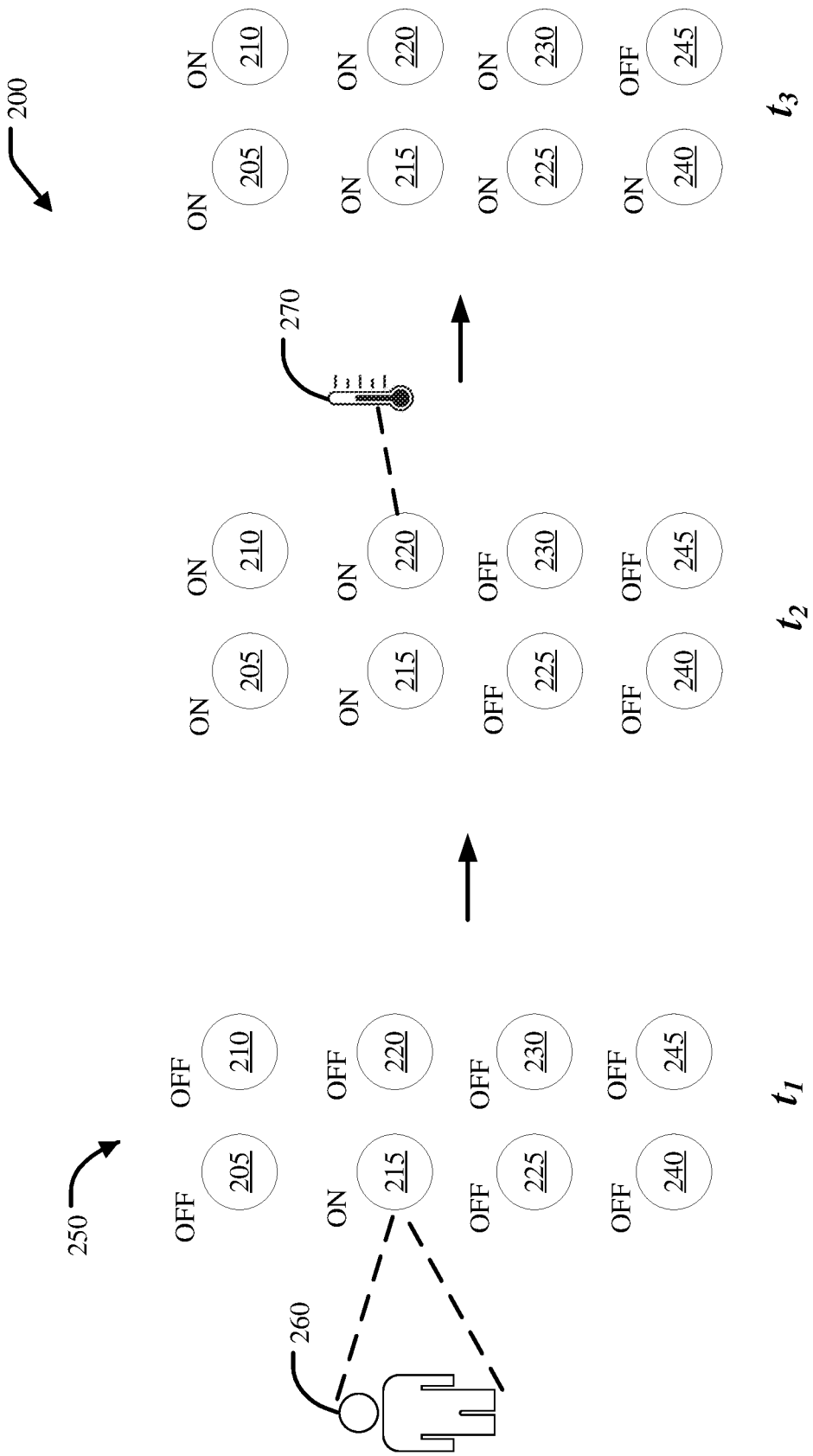
FIG. 2 is a diagram illustrating an IoT sensor network, in accordance with embodiments of the present disclosure.

Turning now to FIG. 2, illustrated is a diagram 200 depicting the management of an IoT sensor network 250 over time, in accordance with embodiments of the present disclosure. The IoT sensor network 250 includes a first sensor 205, a second sensor 210, a third sensor 215, a fourth sensor 220, a fifth sensor 225, a sixth sensor 230, a seventh sensor 240, and an eighth sensor 245 (hereinafter collectively referred to as "sensors"). In embodiments, the sensors can be substantially similar to the IoT devices 105 described with respect to FIG. 1. The IoT sensor network 250 is depicted in three states: a first state at a first time $t_1$, a second state at a second time $t_2$, and a third state at a third time $t_3$.

At $t_1$, only the third sensor 215 is in an active state ("ON"). In this context, the third sensor 215 can be referred to as a "master node," as the data collected from the third sensor 215 dictates the activation of the remaining sensors (referred to as "slave nodes") within the IoT sensor network 250. In this example, the third sensor 215 is an image sensor that collects an image of an individual 260. An IoT device manager (not shown, but can be substantially similar to the IoT device management application 160 of FIG. 1 or the IoT device management system 330 of FIG. 3) can then analyze the image data collected by the third sensor 215 such that the IoT device sensor network 250 can be managed. In this example, the identification of the individual 260 leads to the activation of the first sensor 205, second sensor 210, and fourth sensor 220.

At $t_2$, the first sensor 205, second sensor 210, third sensor 215, and fourth sensor 220 are in an active state ("ON") such that they actively collect sensor data. In this example, the fourth sensor 220 is a thermal sensor configured to collect temperature data. The temperature data can be analyzed by an IoT device manager such that the sensors within the IoT sensor network 250 can be controlled. In this example, a temperature reading 270 collected by the fourth sensor 220 leads to the activation of the fifth sensor 225, sixth sensor 230, and seventh sensor 240.

At $t_3$, only the eighth sensor 245 is in an inactive state ("OFF"). The eighth sensor 245 may remain in the inactive state until contextual data collected by the active sensors dictates that the eighth sensor 245 should be activated.

In embodiments, collection of sensor data by the active sensors can lead to deactivation of any of the active sensors based on applicable deactivation conditions (e.g., thresholds dictating the deactivation of sensors within the IoT sensor network 250). For example, a sensor measurement from the sixth sensor 230 can lead to deactivation of the first sensor 205, a sensor measurement from the fourth sensor 220 can lead to deactivation of the fifth sensor 225, sensor measurements from the second sensor 210 and seventh sensor 240 can lead to deactivation of the third sensor 215, etc.

As depicted in FIG. 2, the state of the IoT sensor network 250 can be managed based on active sensors (master nodes) within the IoT sensor network 250. Though reference is made to particular sensor types (e.g., an image sensor and a temperature sensor) and particular activation conditions (e.g., identification of the individual 260, observation of the temperature reading 270), any suitable sensors and/or activation conditions can be implemented. Sensors can include audio sensors, flow sensors, electrical sensors, pressure sensors, proximity sensors, optical sensors, force sensors, moisture sensors, touch sensors, chemical sensors, radiation sensors, position sensors, tilt sensors, displacement sensors, distance sensors, speed sensors, acceleration sensors, thermal sensors, and others. Activation conditions can include conditions such as: a sensor value exceeding a sensor threshold, a sensor value falling below a sensor threshold, a rate of change of sensor data exceeding a rate of change threshold, a rate of change of sensor data falling below a rate of change threshold, an average sensor value exceeding a threshold, an average sensor value falling below a threshold, and others. In some embodiments, activation conditions can be based on data collected from two or more sensors. For example, data collected from two or more sensors can be compared to two or more respective thresholds such that IoT sensor network 250 can be managed.

Though FIG. 2 only depicts sensors altered from an inactive ("OFF") state to an active ("ON") state, in embodiments, contextual data can dictate the deactivation of sensors. For example, at a later time, if the temperature reading 270 falls below a threshold temperature value, the fifth sensor 225, sixth sensor 230, and seventh sensor 240 can be reverted to an inactive state.

Figure 3:
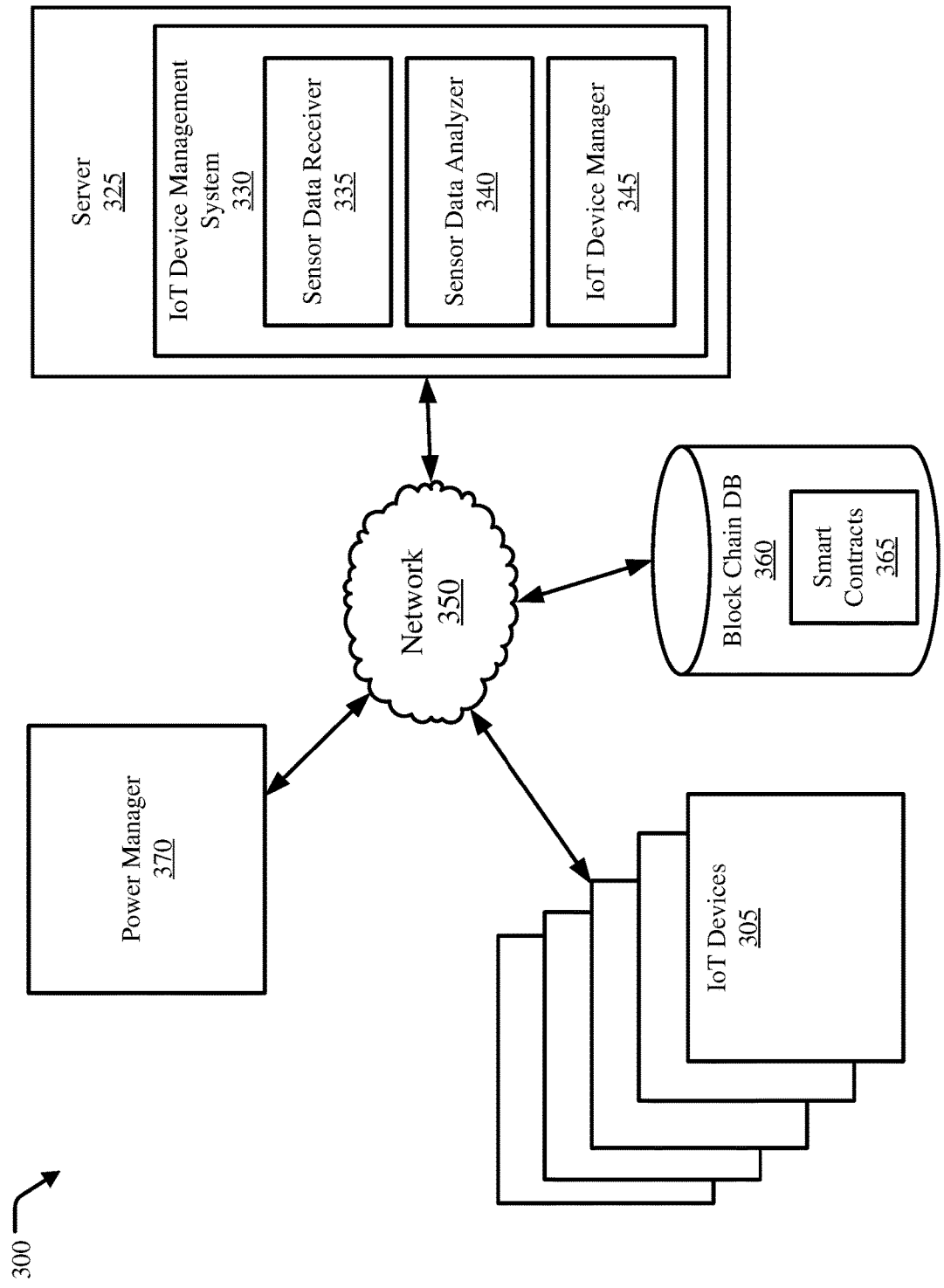
FIG. 3 is a block diagram illustrating an example computing environment including an IoT device management system, in accordance with embodiments of the present disclosure.

Referring now to FIG. 3, shown is a block diagram of an example computing environment 300 in which illustrative embodiments of the present disclosure can be implemented. The computing environment 300 includes IoT devices 305, a server 325, a block chain database 360, and a power manager 370. The IoT devices 305, server 325, blockchain database 360, and power manager 370 can be communicatively coupled through network 350.

Consistent with various embodiments, the IoT devices 305 can be configured to collect sensor data (e.g., contextual data). Various IoT devices 305 can be implemented, including those described with respect to FIG. 2 (e.g., optical sensors, thermal sensors, pressure sensors, etc.). In embodiments, a subset (e.g., at least one) of IoT devices 305 are in an active state and the remaining IoT devices 305 are in an inactive state. This is completed to preserve computing resources and power. For example, it may not be necessary for all IoT devices to be in an active state, as some IoT devices may only require activation in particular contexts. As such, IoT devices 305 in the active state can collect contextual data that dictates the activation of IoT devices 305 in the inactive state. The designation of IoT devices 305 in the active state and IoT devices 305 in the inactive state can, in some embodiments, be configured by a user.

The server 325 includes an IoT device management system 330. The IoT device management system 330 is configured to manage the state (e.g., active and inactive) of IoT devices 305. The IoT device management system 330 includes a sensor data receiver 335, a sensor data analyzer 340, and an IoT device manager 345. The sensor data receiver 335, sensor data analyzer 340, and IoT device manager 345 can be processor executable instructions that can be executed by a dedicated or shared processor using received inputs (e.g., from IoT devices 305).

The sensor data receiver 335 can be configured to receive sensor data from IoT devices 305. The sensor data can be received in real-time from active IoT devices 305 over network 350. Any suitable sensor data can be received, including, but not limited to, image data (e.g., frames of videos, images, etc.), electrical data (e.g., voltage readings, current readings, etc.), thermal data (e.g., temperature readings), audio data (e.g., audio snippets, decibel readings, etc.), pressure data, concentration data (e.g., chemical concentration in a gas or liquid), flow data (e.g., volumetric flow rate, flow speed, etc.), position data, velocity data, acceleration data, angular position data, and others. The sensor data can be in any suitable format. For example, image data, audio data, or textual data format can vary (e.g., jpeg vs. tiff, mp3 vs. way, txt vs. docx, etc.). The sampling rate and/or units of measurement associated with sensor data can also vary.

In embodiments, the sensor data receiver 335 can be configured to pre-process the received sensor data prior to analyzation by the sensor data analyzer 340. This can be completed such that the sensor data is in a format suitable for analysis. For example, if the sensor data analyzer 340 is only configured to analyze images in a first image format (jpeg), then the sensor data receiver 335 can be configured to reformat images into the first image format.

The sensor data analyzer 340 is configured to analyze the sensor data to determine whether to activate and/or deactivate IoT devices 305. Various conditions can be implemented to facilitate the activation and/or deactivation of IoT devices 305. The implemented conditions can depend on the type of sensor from which the data was received from. For example, object detection can be performed on images received from a visual sensor (e.g., a camera) of the IoT devices 305. In this example, the detection of particular objects (e.g., a human, a vehicle, etc.) within images can be utilized to dictate the activation of inactive IoT devices. As another example, if an active sensor is an audio sensor, a decibel threshold can be implemented to dictate the activation of inactive IoT devices. As another example, if an active sensor is a pressure sensor, a pressure threshold can be implemented to dictate the activation of inactive IoT devices.

In embodiments, a sensor reading value exceeding or falling below a threshold value can be used to control the status of IoT devices 305. As an example, assume measurements obtained from a force sensor are used to dictate the activation and deactivation of a visual sensor (e.g., a camera). In this example, if a force sensor reading exceeds a force threshold, then the visual sensor can be activated. If the force sensor reading later falls below the force threshold, then the visual sensor can be deactivated. This can be completed for any suitable sensor based on any suitable sensor reading.

In some embodiments, a rate of change of sensor readings can be used to control the status of IoT devices 305. As an example, assume that measurements obtained from a chemical sensor are used to dictate the activation and deactivation of a thermal sensor. In this example, if the rate of change of the concentration of a chemical species exceeds a threshold, then the thermal sensor can be activated. If the rate of change of the concentration of the chemical species falls below the threshold, then the thermal sensor can be deactivated. This can be completed for any suitable sensor based on any suitable sensor reading.

In embodiments where visual sensors are used to control the status of IoT devices 305, features within images can be used to activate and/or deactivate inactive IoT devices 305. For example, the identification of particular objects within images can be used to dictate the activation and/or deactivation of inactive IoT devices 305. To do so, the sensor data analyzer 340 can be configured to perform a variety of image processing techniques, including, but not limited to Viola-Jones object detection, scale-invariant feature transform (SIFT), histogram of oriented gradients (HOG), region based convolutional neural networks (R-CNN), single shot multibox detector (SSD) and you only look once (YOLO).

As an example, assume that sensor data collected by a first visual sensor dictates the activation of a second visual sensor. In this example, an activation condition of the second visual sensor may be the detection of a human by the first visual sensor. Upon collection of a video by the first visual sensor, the video can be dispatched to the IoT device management system 330 and analyzed by the sensor data analyzer 340. The sensor data analyzer 340 can then perform object detection (e.g., R-CNN) on the frames of the video, thereby leading to detection of a human. In response to detection of the human, the second visual sensor can be activated by the IoT device management system 330.

Though reference is made to activating a second visual sensor based on data collected by a first visual sensor, in embodiments, any other suitable sensor (e.g., a thermal sensor, pressure sensor, force sensor, etc.) can be activated based on data collected by a visual sensor.

In embodiments where audio sensors (e.g., microphones) are used to control the status of IoT devices 305, particular utterances within audio data can be used to activate and/or deactivate inactive IoT devices 305. For example, the recognition of a particular phrase within collected audio data can be used to dictate the activation and/or deactivation of inactive IoT devices 305. To do so, the sensor data analyzer 340 can be configured to perform a variety of speech recognition algorithms, such as those including hidden Markov models (HMMs), dynamic time warping (DTW), and neural networks.

As an example, assume that sensor data collected by a first audio sensor dictates the activation of a visual sensor. In this example, activation of the visual sensor may be completed in response to recognition of any of the phrases "breach," "danger," "caution," and "warning." Upon collection of audio data by the audio sensor, the audio data can be transmitted to the IoT device management system 330 and analyzed by the sensor data analyzer 340. The sensor data analyzer 340 can then perform speech recognition on the audio stream, thereby identifying the phrase "warning." In response to recognizing the phrase "warning," the visual sensor can be activated by the IoT device management system 330.

Though reference is made to the activation of a visual sensor based on data collected by an audio sensor, any other suitable sensor can be activated based on data collected by an audio sensor.

In embodiments, activation and/or deactivation conditions can be embodied as terms within smart contracts 365 of the block chain database 360. In particular, the activation and/or deactivation conditions can be written as code committed to the block chain database 360. When a condition outlined in the smart contracts 365 is triggered (e.g., a threshold is exceeded, an object is detected, etc.), the code executes and the corresponding activation or deactivation action can be executed. By incorporating activation and deactivation conditions into smart contracts 365, autonomy over the execution of the conditions is achieved, security is enhanced (e.g., sensor data and smart contract 365 terms can be encrypted and stored in the block chain database 360), and the resiliency of the stored data is increased (as it is backed-up to block chain database 360).

The sensor data analyzer 340 then dispatches the management action to be executed to the IoT device manager 345. The IoT device manager 345 is configured to alter the state of applicable IoT devices 305 indicated by the sensor data analyzer 340. In embodiments, the IoT device manager 345 transmits an indication to the power manager 370 regarding the specific IoT devices 305 that require a power state alteration. The power manager 370 can then sever power to any activated IoT devices 305 that require deactivation or provide power to any inactive IoT devices 305 that require activation.

In embodiments, the power manager 370 can be a wireless power router operable to provide power to or rescind power from connected IoT devices 305. In these embodiments, the power manager 370 can wirelessly transmit power to each IoT device 305 in the IoT sensor network. The power manager 370 can be configured to remove power provided to specific IoT devices 305 by altering its communicative connection with IoT devices 305 on a device-by-device basis. In embodiments, the power manager 370 can include a network adaptor such that it can receive management actions from the IoT device management system 330.

In embodiments, the power manager 370 can be electrically hard wired to IoT devices 305 and operable to provide power to or rescind power from connected IoT devices 305. In these embodiments, the power manager 370 may be a power strip, extension block, power distributor, or other device operable to provide power to or remove power from IoT devices 305 on a device-by-device basis. In embodiments, the power manager 370 can be centrally located to IoT devices 305 present in the IoT sensor network.

In some embodiments, power is provided to or removed from IoT devices 305 using a wireless signal. For example, the IoT device manager 345 can issue commands to IoT devices 305 to change their state from "ON" (e.g., powered or active) to "OFF" (e.g., sleep mode, idle, inactive, etc.). Thus, a physical power manager 370 is not necessarily required, as power can be controlled wirelessly based on signals transmitted by the IoT device manager 345. In embodiments, power can be provided to or removed from IoT devices 305 in a mechanical or magnetic manner. For example, a switch associated with an IoT device can be flipped using a mechanical or magnetic actuator based on a wireless signal.

In embodiments, inactive IoT devices 305 remain in an idle state such that they receive power necessary to receive a signal to be reactivated. However, in these embodiments, the IoT devices 305 may not collect sensor data while in the idle state.

Upon altering the state of the IoT devices 305, further contextual data can be collected such that future activation and/or deactivation commands can be executed by the IoT device management system 330.

It is noted that FIG. 3 is intended to depict the representative major components of an example computing environment 300. In some embodiments, however, individual components can have greater or lesser complexity than as represented in FIG. 3, components other than or in addition to those shown in FIG. 3 can be present, and the number, type, and configuration of such components can vary.

Figure 4:
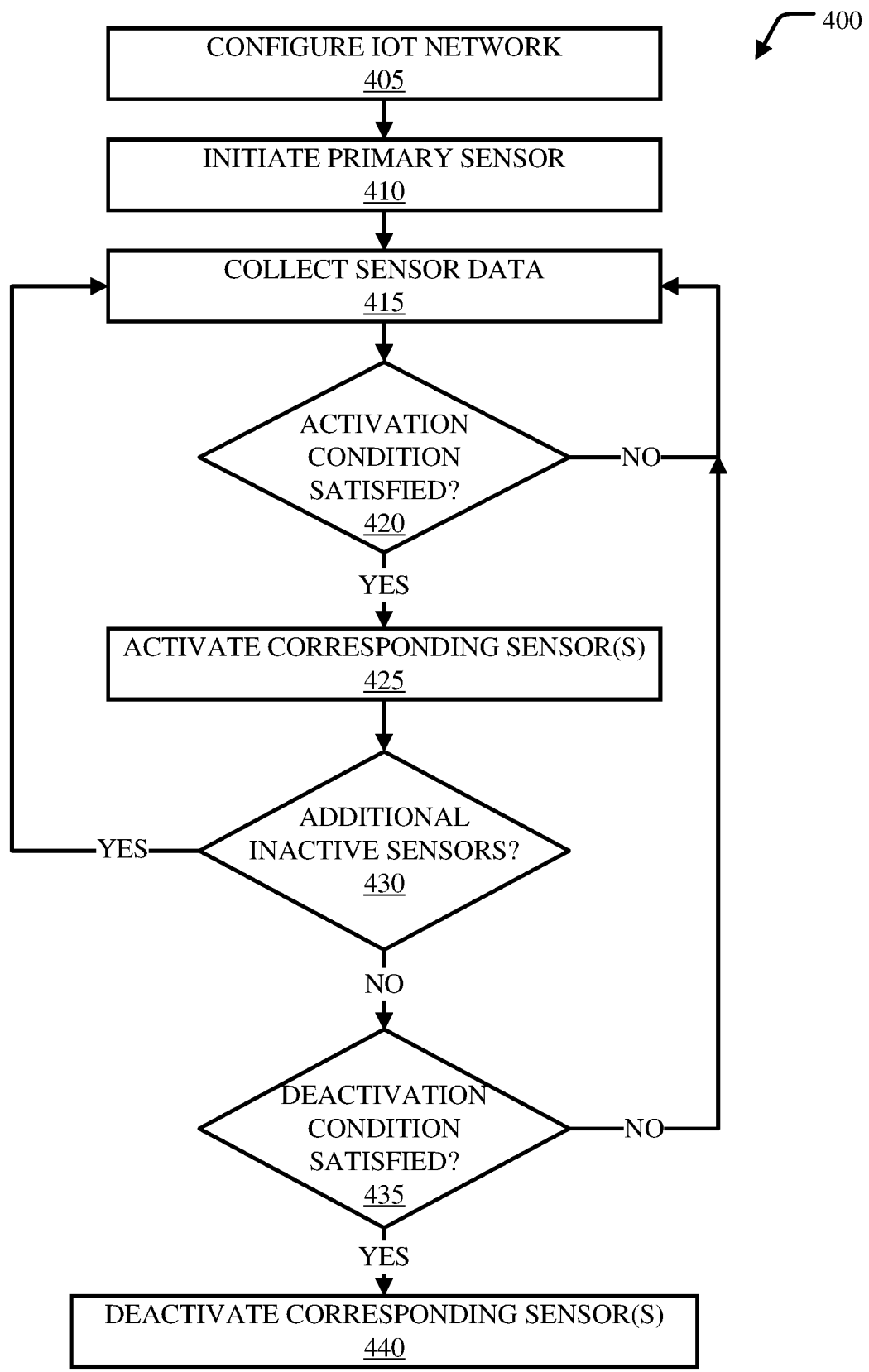
FIG. 4 is flow-diagram illustrating an example method for managing an IoT sensor network, in accordance with embodiments of the present disclosure.

FIG. 4 is a flow diagram illustrating an example method 400 for context based IoT device management, in accordance with embodiments of the present disclosure.

Method 400 initiates at operation 405, where an IoT sensor network (e.g., IoT sensor network 250 of FIG. 2) is configured. The IoT sensor network can be configured with any suitable sensors. In embodiments, the IoT sensor network is electrically coupled (e.g., wired or wirelessly) to a power manager (e.g., power manager 370 of FIG. 3). The power manager can be configured to control power provided to or removed from each IoT device on a device-by-device basis. In embodiments, configuring the IoT sensor network can include defining master nodes and slave nodes within the network. In embodiments, configuring the IoT sensor network can include defining activation and deactivation conditions for each IoT device.

A primary sensor (master node) is then initiated. This is illustrated at operation 410. In embodiments, multiple primary sensors can be initiated simultaneously. The primary sensor can be initiated by being provided power by a power manager or an IoT device management system (e.g., IoT device management system 330 of FIG. 1).

Sensor data is then collected. This is illustrated at operation 415. Sensor data can be collected by the primary sensor while activated and can be received over a network.

A determination is made whether an activation condition is satisfied. This is illustrated at operation 420. Activation conditions can be the same as, or substantially similar to, those described with respect to the sensor data analyzer 340 of FIG. 3. For example, activation conditions can include threshold conditions (e.g., sensor reading values exceeding or falling below a threshold, rate of change of sensor values exceeding or falling below a threshold, etc.). In some embodiments, the detection of a particular feature (e.g., a phrase or object) can implemented as an activation condition. In embodiments, activation conditions can be embodied as terms within smart contracts stored within a blockchain database.

If a determination is made that an activation condition is satisfied, then corresponding sensors are activated. This is illustrated at operation 425. For example, if an activation condition for a visual sensor is an observation of a temperature collected by a thermal sensor exceeding a temperature threshold, then if the temperature is determined to exceed the temperature threshold, the visual sensor can be activated.

If an activation condition is not satisfied, then method 400 can return to operation 415, where additional sensor data is collected. This may occur until a determination is made that an activation condition is satisfied.

Upon activating corresponding sensors at operation 425, a determination is made whether there are additional inactive sensors. This is illustrated at operation 430. This can be completed by referencing power states of all IoT devices within an IoT sensor network. In some embodiments, the power state of all IoT devices can be obtained from a power manager. If a determination is made that there are additional inactive sensors, then method 400 returns to operation 415, where additional sensor data is collected. This can be completed such that sensor data dictating the activation of the inactive sensors can be collected.

If a determination is made that there are not additional inactive sensors, then method 400 proceeds to operation 435, where a determination is made whether a deactivation condition is satisfied. The deactivation conditions can be the same as, or substantially similar to, the deactivation conditions discussed with respect to FIGS. 2-3. For example, deactivation conditions can include threshold conditions.

If a determination is made that a deactivation condition is satisfied, then corresponding sensors are deactivated. This is illustrated at operation 440. For example, if the deactivation of a visual sensor is completed in response to a temperature obtained from a thermal sensor falling below a temperature threshold, then if an observed temperature is below the temperature threshold, the visual sensor can be deactivated.

If a determination is made that a deactivation condition is not satisfied, then method 400 can return back to operation 415 where additional sensor data is collected. Thus, sensor data can be collected until a deactivation condition is satisfied.

The aforementioned operations can be completed in any order and are not limited to those described. Additionally, some, all, or none of the aforementioned operations can be completed, while still remaining within the spirit and scope of the present disclosure. For example, in embodiments, if a deactivation condition is not satisfied at operation 435, it may not be required to iterate through operations 420-430. That is, sensor data can be collected at operation 415 and a determination can be made whether a deactivation condition is satisfied at operation 435 without completing operations 420-430.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
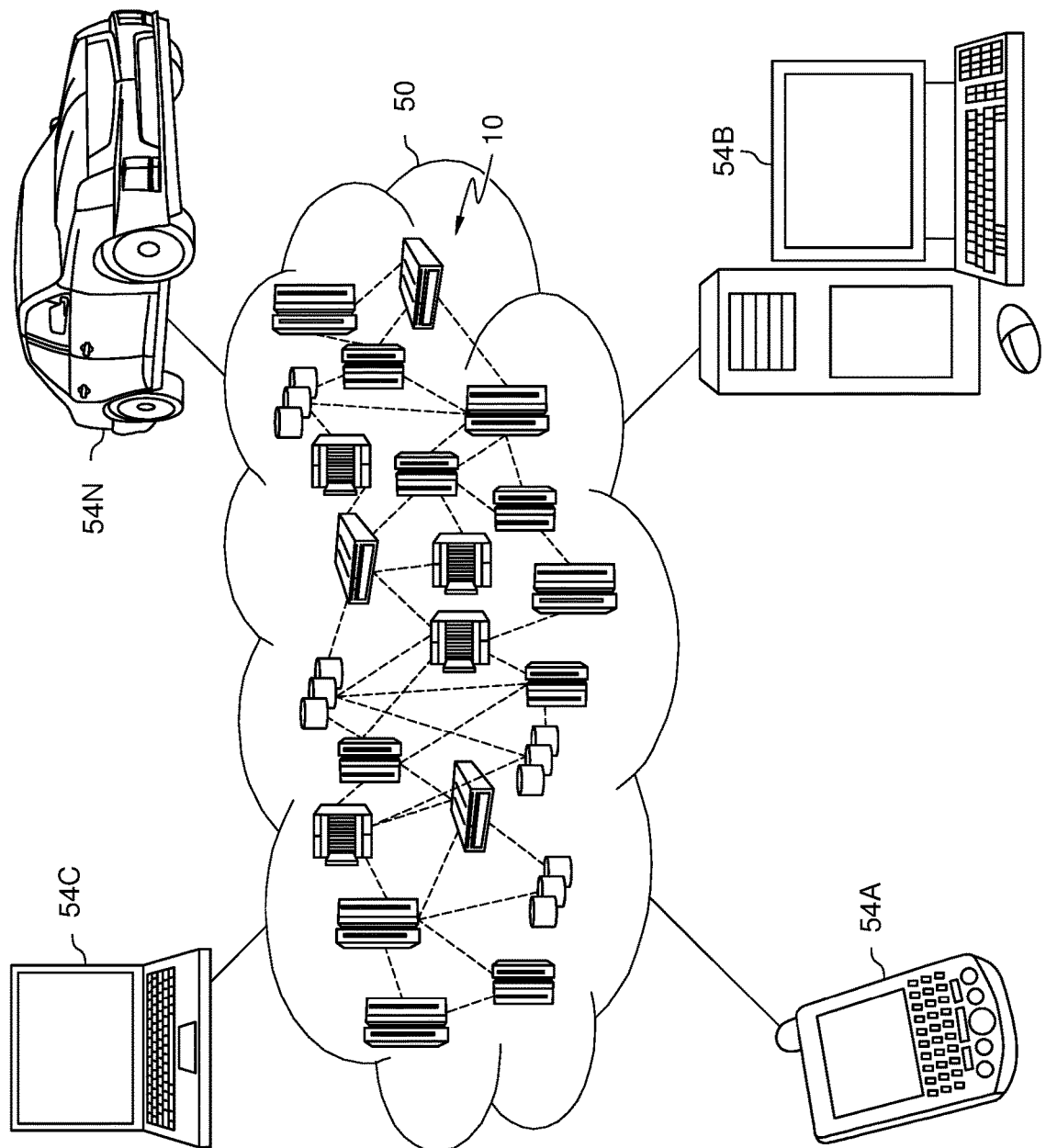
FIG. 5 is a diagram illustrating a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) (e.g., IoT devices 305) or cellular telephone 54A (e.g., IoT devices 105), desktop computer 54B (e.g., server 135, server 325), laptop computer 54C, and/or automobile computer system 54N (e.g., sensor 205) may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
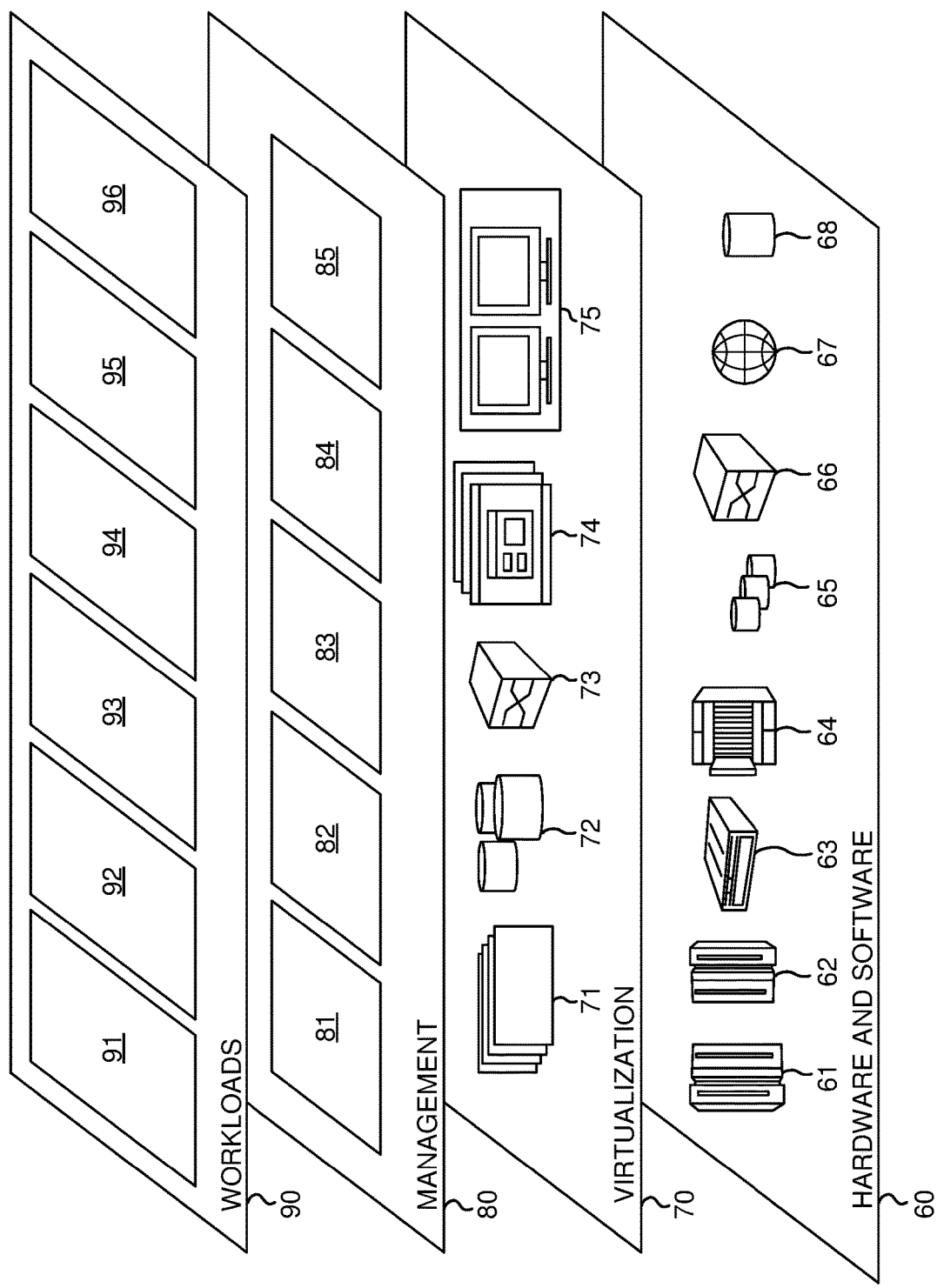
FIG. 6 is a block diagram illustrating abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized.

Examples of workloads and functions which may be provided from this layer include: mapping and navigation 91; software development and lifecycle management 92; virtual classroom education delivery 93; data analytics processing 94; transaction processing 95; and IoT device management 96.

Figure 7:
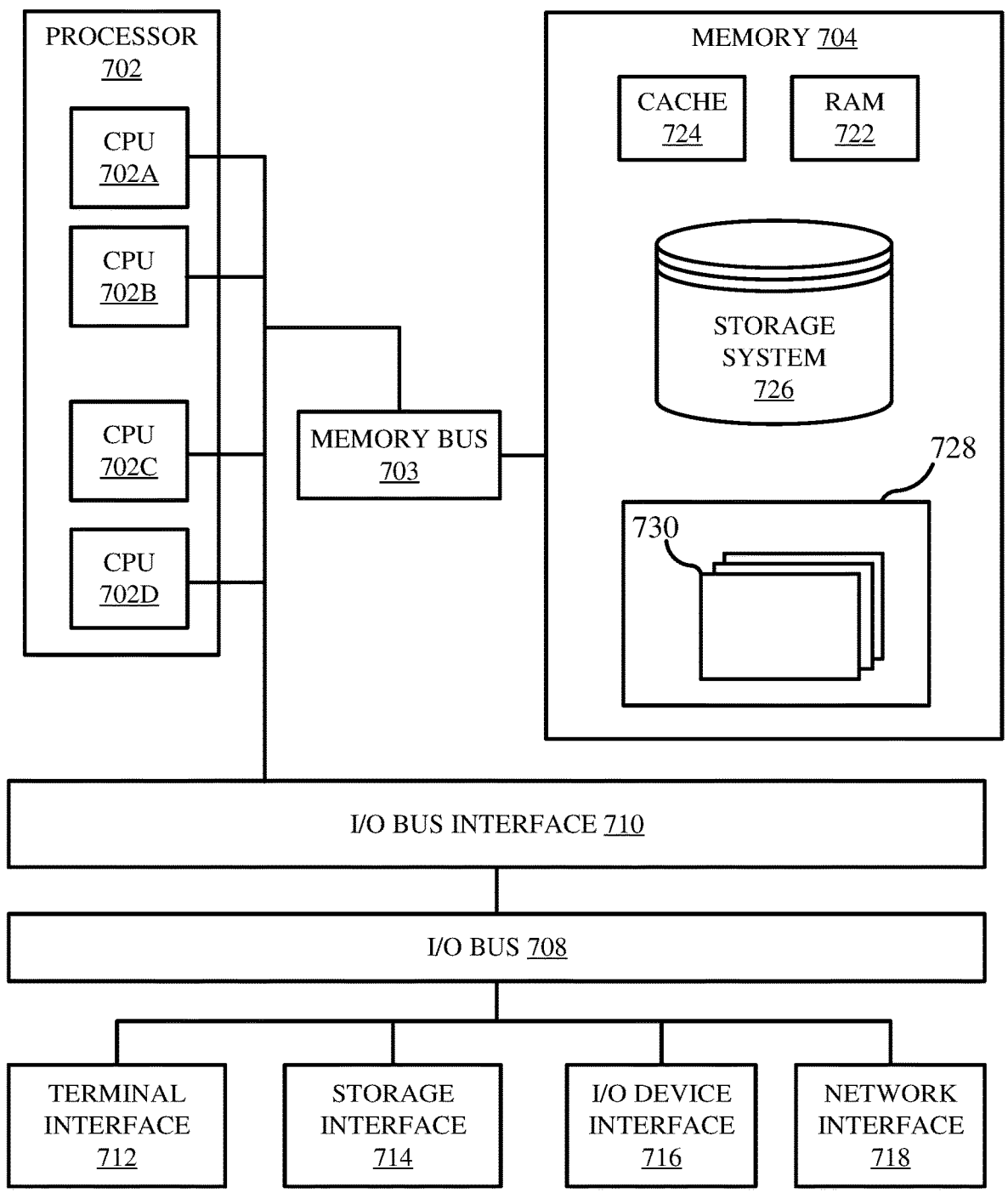
FIG. 7 is a high-level block diagram illustrating an example computer system that can be used in implementing one or more of the methods, tools, and modules, and any related functions described herein, in accordance with embodiments of the present disclosure.

Referring now to FIG. 7, shown is a high-level block diagram of an example computer system 701 that may possibly be utilized in various devices discussed herein (e.g., devices 105, server 135, sensors 205-245, IoT devices 305, server 325, power manager 370) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702 (also referred to as processors herein), a memory 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

Memory 704 may include computer system readable media in the form of volatile memory, such as random-access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

In some embodiments, the program modules 730 of the computer system 701 include an IoT device management module. The IoT device management module can be configured to receive a first set of sensor data from a first IoT device within an IoT sensor network, the IoT sensor network containing a plurality of IoT devices, where a subset of the plurality of IoT devices within the IoT sensor network are in an inactive state. The IoT device management module can be configured to analyze the first set of sensor data to determine whether an activation condition is satisfied. In response to determining that the activation condition is satisfied, the IoT device management module can be configured to activate a second IoT device within the subset, where activation leads to collection of a second set of sensor data from the second IoT device.

Although the memory bus 703 is shown in FIG. 7 as a single bus structure providing a direct communication path among the CPUs 702, the memory 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   receiving a first set of sensor data from a first internet of things (IoT) device within an IoT sensor network, the IoT sensor network containing a plurality of IoT devices, wherein a subset of the plurality of IoT devices within the IoT sensor network are in an inactive state;
   analyzing the first set of sensor data to determine whether an activation condition is satisfied;
   activating, in response to determining that the activation condition is satisfied, a second IoT device within the subset, wherein activation leads to collection of a second set of sensor data from the second IoT device;
   analyzing the first and second sets of sensor data to determine whether a deactivation condition is satisfied, wherein analyzing the first and second sets of sensor data includes determining a first rate of change of the first set of sensor data and comparing the first rate of change of the first set of sensor data to a first rate of change threshold and determining a second rate of change of the second set of sensor data and comparing the second rate of change of the second set of sensor data to a second rate of change threshold, wherein the deactivation condition specifies that the first IoT device is deactivated in response to a combination of the first rate of change of the first set of sensor data falling below the first rate of change threshold and the second rate of change of the second set of sensor data falling below the second rate of change threshold; and
   deactivating, in response to determining that the deactivation condition is satisfied, the first IoT device, wherein deactivation of the first IoT device stops collection of sensor data from the first IoT device.

2. The method of claim 1, further comprising:
   analyzing the second set of sensor data to determine whether a second activation condition is satisfied; and
   activating, in response to determining that the second activation condition is satisfied, a third IoT device within the subset, wherein activation of the third IoT device leads to collection of a third set of sensor data from the third IoT device.

3. The method of claim 1, wherein the first IoT device is a visual sensor, wherein the first set of sensor data includes a video, and wherein the activation condition is determined to be satisfied in response to detecting a first object within the video.

4. The method of claim 1, wherein the first IoT device is an audio sensor, wherein the first set of sensor data includes an audio snippet, and wherein the activation condition is determined to be satisfied in response to recognizing a first phrase within the audio snippet.

5. The method of claim 1, further comprising:
   analyzing the second set of sensor data to determine whether a second activation condition is satisfied; and
   activating, in response to determining that the second activation condition is satisfied, a third IoT device and a fourth IoT device within the subset, wherein activation of the third IoT device leads to collection of a third set of sensor data from the third IoT device, wherein activation of the fourth IoT device leads to collection of a fourth set of sensor data from the fourth IoT device.

6. The method of claim 5, further comprising:
   analyzing the third set of sensor data and fourth set of sensor data to determine whether a third activation condition is satisfied, wherein the third activation condition is based on the third and fourth sets of sensor data; and
   activating, in response to determining that the third activation condition is satisfied, a fifth IoT device, wherein the activation of the fifth IoT device leads to collection of a fifth set of sensor data from the fifth IoT device.

7. A system comprising:
   a memory storing program instructions; and
   a processor, wherein the processor is configured to execute the program instructions to perform a method comprising:
   receiving a first set of sensor data from a first internet of things (IoT) device within an IoT sensor network, the IoT sensor network containing a plurality of IoT devices, wherein a subset of the plurality of IoT devices within the IoT sensor network are in an inactive state;
   analyzing the first set of sensor data to determine whether an activation condition is satisfied;
   activating, in response to determining that the activation condition is satisfied, a second IoT device within the subset, wherein activation leads to collection of a second set of sensor data from the second IoT device;
   analyzing the first and second sets of sensor data to determine whether a deactivation condition is satisfied, wherein analyzing the first and second sets of sensor data includes determining a first rate of change of the first set of sensor data and comparing the first rate of change of the first set of sensor data to a first rate of change threshold and determining a second rate of change of the second set of sensor data and comparing the second rate of change of the second set of sensor data to a second rate of change threshold, wherein the deactivation condition specifies that a third IoT device is deactivated in response to a combination of the first rate of change of the first set of sensor data falling below the first rate of change threshold and the second rate of change of the second set of sensor data falling below the second rate of change threshold; and deactivating, in response to determining that the deactivation condition is satisfied, the third IoT device, wherein deactivation of the third IoT device stops collection of sensor data from the third IoT device.

8. The system of claim 7, wherein prior to analyzing the first and second sets of sensor data to determine whether a deactivation condition is satisfied, the method performed by the processor further comprises:

analyzing the second set of sensor data to determine whether a second activation condition is satisfied; and activating, in response to determining that the second activation condition is satisfied, the third IoT device within the subset, wherein activation of the third IoT device leads to collection of a third set of sensor data from the third IoT device.

9. The system of claim 7, wherein the method performed by the processor further comprises:

analyzing the first set of sensor data to determine whether a second deactivation condition is satisfied; and deactivating, in response to determining that the second deactivation condition is satisfied, the second IoT device.

10. The system of claim 7, wherein the first IoT device is a visual sensor, wherein the first set of sensor data includes a video, and wherein the activation condition is determined to be satisfied in response to detecting a first object within the video.

11. The system of claim 7, wherein the first IoT device is an audio sensor, wherein the first set of sensor data includes an audio snippet, and wherein the activation condition is determined to be satisfied in response to recognizing a first phrase within the audio snippet.

12. The system of claim 7, wherein the method performed by the processor further comprises:

analyzing the second set of sensor data to determine whether a second activation condition is satisfied; and activating, in response to determining that the second activation condition is satisfied, the third IoT device and a fourth IoT device within the subset, wherein activation of the third IoT device leads to collection of a third set of sensor data from the third IoT device, wherein activation of the fourth IoT device leads to collection of a fourth set of sensor data from the fourth IoT device.

13. The system of claim 7, wherein the activation condition is stored as a term within a smart contract of a block chain database.

14. A computer program product comprising a computer readable storage medium having program instructions embodied therewith, the program instructions executable by a processor to cause the processor to perform a method comprising:

receiving a first set of sensor data from a first internet of things (IoT) device within an IoT sensor network, the IoT sensor network containing a plurality of IoT devices, wherein a subset of the plurality of IoT devices within the IoT sensor network are in an inactive state;

analyzing the first set of sensor data to determine whether a rate of change of the first set of sensor data exceeds a threshold;

activating, in response to determining that the rate of change of the first set of sensor data exceeds the threshold, a second IoT device within the subset, wherein activation leads to collection of a second set of sensor data from the second IoT device;

analyzing the first and second sets of sensor data to determine whether a deactivation condition is satisfied, wherein analyzing the first and second sets of sensor data includes determining a first rate of change of the first set of sensor data and comparing the first rate of change of the first set of sensor data to a first rate of change threshold and determining a second rate of change of the second set of sensor data and comparing the second rate of change of the second set of sensor data to a second rate of change threshold, wherein the deactivation condition specifies that a third IoT device is deactivated in response to a combination of the first rate of change of the first set of sensor data falling below the first rate of change threshold and the second rate of change of the second set of sensor data falling below the second rate of change threshold; and deactivating, in response to determining that the deactivation condition is satisfied, the third IoT device, wherein deactivation of the third IoT device stops collection of sensor data from the third IoT device.

15. The computer program product of claim 14, wherein the method performed by the processor further comprises:

analyzing the second set of sensor data to determine whether a second activation condition is satisfied; and activating, in response to determining that the second activation condition is satisfied, the third IoT device within the subset, wherein activation of the third IoT device leads to collection of a third set of sensor data from the third IoT device.

16. The computer program product of claim 14, wherein the method performed by the processor further comprises:

analyzing the second set of sensor data to determine whether a second activation condition is satisfied; and activating, in response to determining that the second activation condition is satisfied, the third IoT device and a fourth IoT device within the subset, wherein activation of the third IoT device leads to collection of a third set of sensor data from the third IoT device, wherein activation of the fourth IoT device leads to collection of a fourth set of sensor data from the fourth IoT device.

17. The method of claim 1, wherein the activation condition specifies that the second IoT device is activated in response to a sensor value received from the first IoT device exceeding a threshold sensor value.

18. The method of claim 1, wherein the deactivation condition further specifies that the first IoT device is deactivated in response to a combination of a first sensor value received from the first IoT device falling below a first sensor value threshold and a second sensor value received from the second IoT device falling below a second sensor value threshold.

19. The method of claim 1, further comprising:

deactivating, in response to determining that the deactivation condition is satisfied, a third IoT device, wherein deactivation of the third IoT device stops collection of sensor data from the third IoT device.

* * * * *